US010318764B2

(12) United States Patent
Brown et al.

(10) Patent No.: US 10,318,764 B2
(45) Date of Patent: Jun. 11, 2019

(54) METHOD AND APPARATUS FOR DIFFERENTIATED ACCESS CONTROL

(71) Applicant: BlackBerry Limited, Waterloo (CA)

(72) Inventors: Michael Kenneth Brown, Fergus (CA); Christopher Lyle Bender, Waterloo (CA); Herbert Anthony Little, Waterloo (CA); Michael Stephen Brown, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/193,614

(22) Filed: Jun. 27, 2016

(65) Prior Publication Data

US 2016/0306987 A1 Oct. 20, 2016

Related U.S. Application Data

(63) Continuation of application No. 13/242,589, filed on Sep. 23, 2011, now Pat. No. 9,378,394.

(60) Provisional application No. 61/386,245, filed on Sep. 24, 2010, provisional application No. 61/386,270, filed on Sep. 24, 2010, provisional application No. 61/386,689, filed on Sep. 27, 2010.

(51) Int. Cl.
| | |
|---|---|
| *G06F 21/62* | (2013.01) |
| *G06F 3/0481* | (2013.01) |
| *G06F 3/0482* | (2013.01) |
| *H04W 12/08* | (2009.01) |

(52) U.S. Cl.
CPC .......... *G06F 21/629* (2013.01); *G06F 3/0482* (2013.01); *G06F 3/04817* (2013.01); *G06F 21/6281* (2013.01); *H04W 12/08* (2013.01); *G06F 2221/2149* (2013.01); *G06F 2221/2151* (2013.01)

(58) Field of Classification Search
None
See application file for complete search history.

(56) References Cited

U.S. PATENT DOCUMENTS

| | | | |
|---|---|---|---|
| 4,945,556 A | 7/1990 | Namekawa |
| 5,557,732 A | 9/1996 | Thompson |
| 5,864,765 A | 1/1999 | Barvesten |

(Continued)

FOREIGN PATENT DOCUMENTS

| | | |
|---|---|---|
| CN | 1744100 A | 3/2006 |
| CN | 1747602 A | 3/2006 |

(Continued)

OTHER PUBLICATIONS

Wikipedia "Operating system-level virtualization", as captured by Archive.org on Feb. 14, 2010, https://web.archive.org/web/20100214031340/http://en.wikipedia.org/wiki/Operating_system-level_virtualization.

(Continued)

*Primary Examiner* — Thomas J Dailey
(74) *Attorney, Agent, or Firm* — Moffat & Co

(57) ABSTRACT

A method for differentiated access control on a computing device having a connection with a second device, the method checking whether a timer has expired on the second device or if a connection is lost to the second device; and preventing at least one of the plurality of application subsets from being launched or enabled if the timer has expired on the second device or the connection is lost to the second device.

24 Claims, 11 Drawing Sheets

(56) References Cited

U.S. PATENT DOCUMENTS

| | | |
|---|---|---|
| 5,925,129 A | 7/1999 | Combs et al. |
| 5,987,440 A | 11/1999 | O'Neil et al. |
| 5,987,611 A | 11/1999 | Freund |
| 6,052,735 A | 4/2000 | Ulrich et al. |
| 6,105,132 A | 8/2000 | Fritch et al. |
| 6,233,446 B1 | 5/2001 | Do |
| 6,292,798 B1 | 9/2001 | Dockter et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,405,205 B1 | 6/2002 | Britton et al. |
| 6,412,070 B1 | 6/2002 | Van Dyke et al. |
| 6,516,421 B1 | 2/2003 | Peters |
| 6,577,239 B2 * | 6/2003 | Jespersen ............ G08B 13/1418 340/539.11 |
| 6,647,388 B2 | 11/2003 | Numao et al. |
| 6,651,173 B1 | 11/2003 | Rodriguez et al. |
| 6,668,323 B1 | 12/2003 | Challener et al. |
| 6,757,821 B1 | 6/2004 | Akiyama et al. |
| 6,772,350 B1 | 8/2004 | Belani et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,957,330 B1 | 10/2005 | Hughes |
| 6,978,385 B1 | 12/2005 | Cheston et al. |
| 6,999,562 B2 | 2/2006 | Winick |
| 7,246,374 B1 | 7/2007 | Simon et al. |
| 7,305,709 B1 | 12/2007 | Lymer et al. |
| 7,331,058 B1 | 2/2008 | Gladney |
| 7,400,878 B2 | 7/2008 | Hassan et al. |
| 7,463,861 B2 * | 12/2008 | Eisenbach ............ G06F 21/6218 380/247 |
| 7,496,667 B2 | 2/2009 | Adam et al. |
| 7,555,776 B1 | 6/2009 | Lymer et al. |
| 7,574,200 B2 | 8/2009 | Hassan et al. |
| 7,715,818 B2 | 5/2010 | Sato |
| 7,734,284 B2 | 6/2010 | Adams et al. |
| 7,840,621 B2 | 11/2010 | Yoshizawa |
| 7,869,789 B2 | 1/2011 | Hassan et al. |
| 8,063,872 B2 | 11/2011 | Black et al. |
| 8,074,078 B2 | 12/2011 | Brown et al. |
| 8,127,254 B2 | 2/2012 | Lindberg et al. |
| 8,375,454 B2 | 2/2013 | Sun |
| 8,544,084 B2 | 9/2013 | Owen et al. |
| 8,661,531 B2 | 2/2014 | Owen et al. |
| 8,775,810 B1 * | 7/2014 | Snodgrass ................ H04L 9/08 713/175 |
| 8,904,479 B1 * | 12/2014 | Johansson ............ G06F 21/36 382/181 |
| 9,047,451 B2 | 6/2015 | Brown |
| 9,225,727 B2 | 12/2015 | Bender et al. |
| 2001/0047485 A1 | 11/2001 | Brown et al. |
| 2002/0019944 A1 | 2/2002 | Kou |
| 2002/0031230 A1 | 3/2002 | Sweet et al. |
| 2002/0087880 A1 | 7/2002 | Rhoades et al. |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2002/0120578 A1 | 8/2002 | Sy |
| 2002/0196274 A1 | 12/2002 | Comfort et al. |
| 2003/0005317 A1 | 1/2003 | Audebert et al. |
| 2003/0026220 A1 | 2/2003 | Uhlik et al. |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0132958 A1 | 7/2003 | Himmel et al. |
| 2003/0163685 A1 | 8/2003 | Paatero |
| 2003/0177389 A1 | 9/2003 | Albert et al. |
| 2003/0226015 A1 | 12/2003 | Neufeld et al. |
| 2003/0236983 A1 | 12/2003 | Mihm |
| 2004/0001101 A1 | 1/2004 | Trajkovic et al. |
| 2004/0083382 A1 | 4/2004 | Markham et al. |
| 2004/0093582 A1 * | 5/2004 | Segura .................... G06F 9/526 717/102 |
| 2004/0100983 A1 | 5/2004 | Suzuki et al. |
| 2004/0209608 A1 | 10/2004 | Kouznetsov et al. |
| 2005/0071433 A1 | 3/2005 | Shah |
| 2005/0154935 A1 * | 7/2005 | Jin .......................... G06F 21/31 713/324 |
| 2005/0164687 A1 | 7/2005 | DiFazio |
| 2005/0204138 A1 | 9/2005 | Chiu |
| 2005/0210270 A1 | 9/2005 | Rohatgi et al. |
| 2005/0213763 A1 | 9/2005 | Owen et al. |
| 2005/0245272 A1 | 11/2005 | Spaur et al. |
| 2006/0048236 A1 | 3/2006 | Multerer et al. |
| 2006/0059556 A1 | 3/2006 | Royer |
| 2006/0070114 A1 | 3/2006 | Wood et al. |
| 2006/0089125 A1 | 4/2006 | Frank |
| 2006/0129848 A1 | 6/2006 | Paksoy et al. |
| 2006/0129948 A1 | 6/2006 | Hamzy et al. |
| 2006/0156026 A1 | 7/2006 | Utin |
| 2006/0212589 A1 | 9/2006 | Hayer et al. |
| 2007/0073694 A1 | 3/2007 | Picault et al. |
| 2007/0136311 A1 * | 6/2007 | Kasten ................ H04L 67/1008 |
| 2007/0143415 A1 | 6/2007 | Daigle |
| 2007/0150842 A1 * | 6/2007 | Chaudhri ............ G06F 3/04883 715/863 |
| 2007/0174389 A1 | 7/2007 | Armstrong et al. |
| 2007/0214495 A1 | 9/2007 | Royer et al. |
| 2007/0245026 A1 | 10/2007 | Martin et al. |
| 2007/0259673 A1 | 11/2007 | Willars et al. |
| 2007/0277127 A1 | 11/2007 | Carlson |
| 2008/0005561 A1 | 1/2008 | Brown et al. |
| 2008/0052382 A1 | 2/2008 | Dinh et al. |
| 2008/0081609 A1 | 4/2008 | Burgan et al. |
| 2008/0109876 A1 | 5/2008 | Hitomi et al. |
| 2008/0134299 A1 | 6/2008 | Posamentier |
| 2008/0222711 A1 | 9/2008 | Michaelis |
| 2008/0305771 A1 | 12/2008 | Yajima et al. |
| 2009/0006991 A1 | 1/2009 | Lindberg et al. |
| 2009/0119785 A1 | 5/2009 | Challener et al. |
| 2009/0267731 A1 | 10/2009 | Moritou |
| 2010/0024020 A1 | 1/2010 | Baugher et al. |
| 2010/0080368 A1 * | 4/2010 | Erhart ................ H04M 3/42272 379/93.01 |
| 2010/0115588 A1 * | 5/2010 | Johannesson ....... H04L 63/0892 726/4 |
| 2010/0157867 A1 | 6/2010 | Babin |
| 2010/0018033 A1 | 7/2010 | Zhu et al. |
| 2010/0293543 A1 * | 11/2010 | Erhart ..................... H04W 8/18 718/1 |
| 2010/0319053 A1 | 12/2010 | Gharabally |
| 2011/0051176 A1 | 3/2011 | Kang et al. |
| 2011/0145833 A1 | 6/2011 | De Los Reyes et al. |
| 2011/0185202 A1 | 7/2011 | Black et al. |
| 2011/0265188 A1 * | 10/2011 | Ramaswamy ........ G06F 21/604 726/28 |
| 2011/0307941 A1 | 12/2011 | Dhankshirur et al. |
| 2011/0314467 A1 | 12/2011 | Pearson |
| 2012/0023573 A1 * | 1/2012 | Shi ....................... G06F 3/04883 726/17 |
| 2012/0042359 A1 | 2/2012 | Kuroda et al. |
| 2012/0054853 A1 | 3/2012 | Gupta et al. |
| 2012/0079609 A1 | 3/2012 | Bender et al. |
| 2012/0131663 A1 | 5/2012 | Anchan |
| 2012/0144196 A1 | 6/2012 | Owen et al. |
| 2012/0202527 A1 | 8/2012 | Obradovich et al. |
| 2012/0284297 A1 | 11/2012 | Aguera-Arcas et al. |
| 2012/0297444 A1 * | 11/2012 | Kacherov ................ H04L 63/20 726/1 |
| 2013/0005488 A1 | 1/2013 | Evans et al. |

FOREIGN PATENT DOCUMENTS

| | | |
|---|---|---|
| CN | 101828162 A | 6/2008 |
| CN | 101226575 A | 7/2008 |
| CN | 101523878 A | 9/2009 |
| EP | 0973350 A2 | 1/2000 |
| EP | 0990969 A1 | 4/2000 |
| EP | 1638303 A1 | 3/2006 |

(56) References Cited

FOREIGN PATENT DOCUMENTS

| EP | 2028601 | A1 | 2/2009 |
|---|---|---|---|
| EP | 2116952 | A1 | 11/2009 |
| GB | 2408179 | A | 5/2005 |
| WO | 9905814 | A2 | 2/1999 |
| WO | 0059225 | A1 | 10/2000 |
| WO | 2005045550 | A2 | 5/2005 |
| WO | 200914975 | A1 | 1/2009 |

OTHER PUBLICATIONS

Wikipedia "Solaris Containers", as captured by Archive.org on Apr. 1, 2010, https://web.archive.org/web/20100401072323/http://en.wikipedia.org/wiki/Solaris_Containers.

Wikipedia "Microsoft SharePoint Workspace", as captured by Archive.org on Jun. 30, 2010, https://web.archive.org/web/20100630001904/http://en.wikipedia.org/wiki/Microsoft_SharePoint_Workspace.

Wikipedia "Disk encryption" as captured by Archive.org on Apr. 11, 2010, https://web.archive.org/web/20100411072534/http://en.wikipedia.org/wiki/Full_disk_encryption.

EagleVision: A Pervasive Mobile Device Protection System, Ka Yang, Nalin Subramanian, Deji Qiae, and Wensheng Zhang, Iowa State University (URL:http://www.cs.iastate.edu/~wzhang/papers/eagleVision.pdf), Jul. 2009.

"Using context-profiling to aid access control decisions in mobile devices", Gupta et al., Nokia Research Center (URL: http://www.cerias.purdue.edu/assets/symposium/2011-posters/372-C48.pdf), Mar. 2011.

Olzak, Tom, "Use free sandboxing software to isolate risky behavior" http://www.techrepublic.com/blog/security/use-free-sandboxing-software-to-isolate-risky-behavior/693, Dec. 15, 2008.

Morello, John "Communication & Collaboration: Building an Emergency Operations Center on Groove and SharePoint". TechNet Magazine. Microsoft Corporation. http://technet.microsoft.com/en-us/magazine/2006.10.grooveandsharepoint.aspx, Oct. 2006.

Chou, Yung "Communication & Collaboration: Get into the Groove: Solutions for Secure and Dynamic Collaboration". TechNet Magazine. Microsoft Corporation. http://technet.microsoft.com/en-us/magazine/2006.10.intothegroove.aspx, Oct. 2006.

Lawson, Steven, IDG News "Playbook Will Need BlackBerry Tethering, to Start". PCWorld. http://www.pcworld.com/article/223274/playbook_will_need_blackberry_tethering_to_start.html, Mar. 24, 2011.

Atkins, Lucas "First Look at BlackBerry Mobile HotSpot, Tethering for OS 6.1", http://n4bb.com/5027/first-look-at-blackberry-mobile-hotspot-tethering-os-6-1, Mar. 11, 2011.

Hamlen, Matt, Computer World "PlayBook to allow tethering to BlackBerry smartphones" https://www.computerworld.com/s/article/9204960/PlayBook_to_allow_tethering_to_BlackBerry_smartphones Jan. 13, 2011.

"Customizing User Interation in Smart Phones", Pervasive Computing, IEEE CS (2006) pp. 81-90 (URL:http://www.idi.ntnu.no/grupper/su/bibliography/pdf/2006/Korpipaa2006pc.pdf), 2006.

"Supporting Mobile Privacy and Security through Sensor-Based Context Detection", Julian Seifert, Second International Workshop on Security and Privacy in Spontaneous Interaction and Mobile Phone Use, Finland (URL: http://www.medien.ifi.lmu.de/iwssi2010/papers/iwssi-spmu2010-seifert.pdf), May 17, 2010.

USPTO, Notice of Allowance for U.S. Appl. No. 14/727,357, dated Aug. 8, 2016.

Ni, Yang et al "DiffUser: Differentiated User Access Control on Smartphones" IEEE 6th International Conference on Mobile Adhoc and Sensor Systems, MASS '09, pp. 1012-1017, Oct. 12 2009.

Opera et al "Securing a remote terminal application with a mobile trusted device", 20th Annual Computer Security Applications Conference, pp. 438-447, Dec. 6, 2004.

"Smartphone Security Beyond Lock and Wipe", http://www.enterprisemobiletoday.com/article.php/3887006, Jun. 10, 2010.

Wikipedia "Basic Access Authentication",as captured by Archive.org on Feb. 8, 2010, https://web.archive.org/web/20100208133622/http://en.wikipedia.org/wiki/Basic_access_authentication.

Wikipedia "Digital Access Authentication" as captured by Archive.org on Jan. 7, 2009, https://web.archive.org/web/20090107192519/http://en.wikipedia.org/wiki/Digest_access_authentication.

Wikipedia "Cross-site request forgery" as captured by Archive.org on Nov. 4, 2008, https://web.archive.org/web/20081104133027/http://en.wikipedia.org/wiki/Cross-Site_Request_Forgery.

European Patent Office, Office Action for Application No. 11826253.4, dated Jul. 15, 2016.

Canadian Intellectual Property Office, Office Action for Application No. 2811659, dated Aug. 4, 2016.

\* cited by examiner

| App/Class | Lock Time |
|---|---|
| XYZ | 17:36:24 |
| ABC | 17:28:31 |
| ⋮ | |

FIG. 5

METHOD AND APPARATUS FOR DIFFERENTIATED ACCESS CONTROL

RELATED APPLICATIONS

The present application is a continuation of U.S. patent application Ser. No. 13/242,589, filed Sep. 23, 2011, which claims priority from U.S. Provisional Application No. 61/386,245, filed Sep. 24, 2010; U.S. Provisional Application No. 61/386,270, filed Sep. 24, 2010; and U.S. Provisional Application No. 61/386,689, filed Sep. 27, 2010, the contents of all of which are incorporated herein by reference.

FIELD OF THE DISCLOSURE

The present disclosure relates to computing devices and in particular relates to application security on the computing devices.

BACKGROUND

Computing devices, including mobile devices such as personal digital assistants, smart phones, cellular telephones, laptops, among others, as well as desktop or other computing devices have the capability of running multiple applications at one time. For security purposes, a user or an IT policy for the user may dictate that the computer device lock access to the applications that are running after a period of inactivity. For example, if the user has not touched the computing device for 2 minutes, all of the applications on the device may lock. The user is then required to enter a password prior to the use of any application on the device.

BRIEF DESCRIPTION OF THE DRAWINGS

The present application will be better understood with reference to the drawings, in which:

FIG. 5 shows an example diagram of a table which has a plurality of locked times for various application subsets;

DETAILED DESCRIPTION

Figure 1:
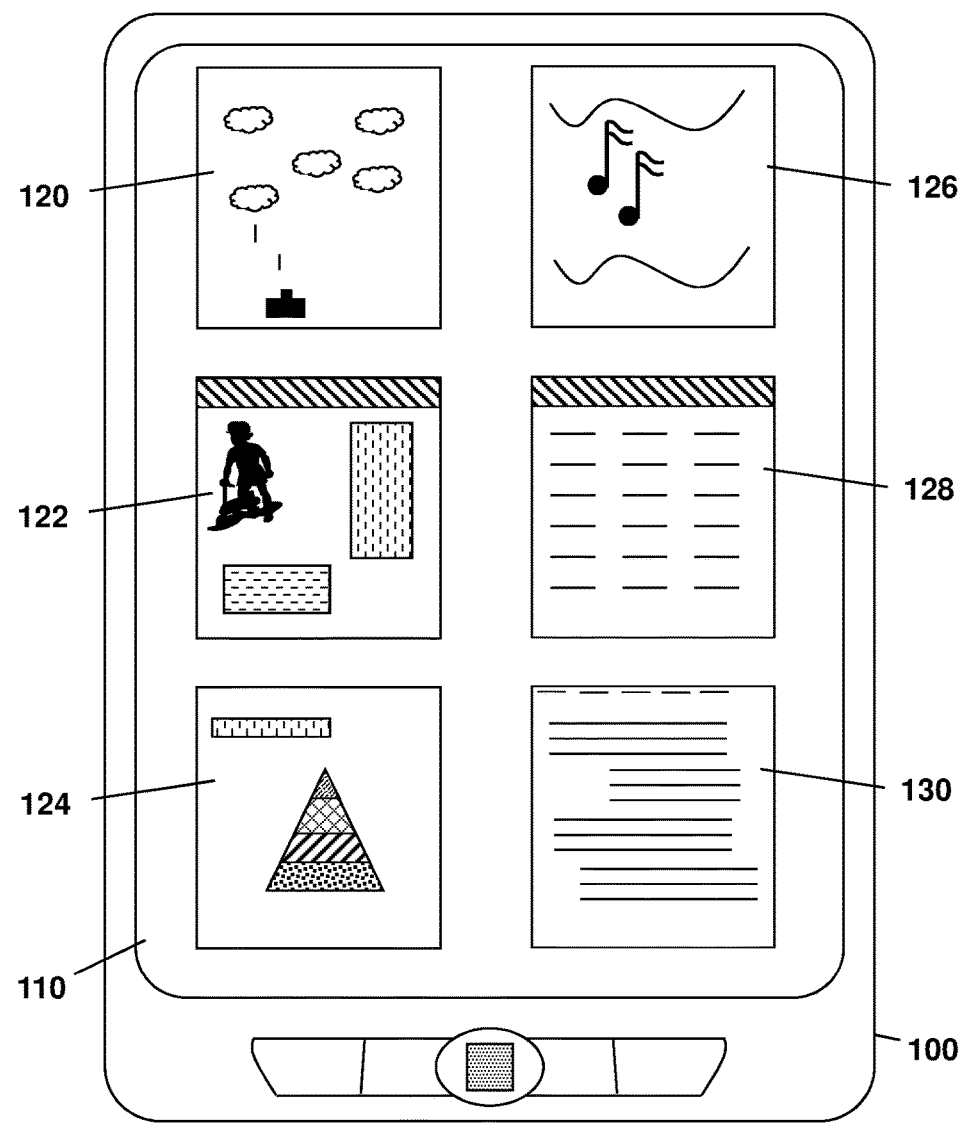
FIG. 1 is an example representation of a user interface showing a cover flow style with running applications.

The present disclosure provides a method for providing differentiated access control on a computing device having a connection with a second device, the method comprising: checking whether a timer has expired on the second device or if a connection is lost to the second device; and preventing each application of at least one of a plurality of application subsets from being launched or enabled if the timer has expired on the second device or the connection is lost to the second device.

The present disclosure further provides a computing device comprising: a processor; a communications subsystem; a user interface; and memory, wherein the computing device communicates with a second device, and wherein the computing device is configured to: determine whether a timer has expired on the second device or if a connection is lost to the second device; and prevent each application of at least one of a plurality of application subsets from being launched or enabled if the timer has expired on the second device or the connection is lost to the second device.

When a user is interacting with a computing device, he or she may have multiple applications running at one time. Some of these applications may be work oriented and some may be personal oriented. For example, work oriented applications may include, but are not limited to, customer relationship management software, enterprise resource planning software, server or desktop virtualization software such as Citrix™, among others. Examples of personal applications may include, but are not limited to, various social networking applications, games, really simple syndication (RSS) readers among others. Hybrid applications which may involve both personal and business oriented functionality, such as email applications may, for security reasons, be considered to be corporate applications.

When used herein, a computing device can be any device capable of running applications and providing a user interface to a user. Examples of computing devices include desktop computers, personal computers, tablets, mobile devices such as smart phones, personal digital assistants (PDAs), digital data devices, among others. The present disclosure is not meant to be limited to any particular computing device.

Many computing devices include an inactivity lock out period. After the inactivity period expires, the device locks and the user must enter a password prior to being permitted to continue utilizing applications that are already running or launching new applications.

One issue is that when a device locks, access to both personal and work oriented applications will also lock. This may be due to an IT policy which required that work items be locked after a certain inactivity time. However, it may not be ideal to force a strict policy onto a user's personal applications merely because work applications are being protected.

The present disclosure provides for a navigation entity that manages launching applications. The entity is aware of which applications are work (business) oriented and which are personal oriented. In case of locking the device from inactivity, the navigation entity can ensure that only work oriented applications require an authentication mechanism such as a password entry to regain access to them.

In other embodiments, applications can be further differentiated into different classes of applications, and various classes of applications can have different inactivity times. Upon the expiration of the inactivity time for a particular class of applications, that class of applications can then be locked and require a password to launch or enable applications already running which are of that class. Any number of classes can be used, and at one extreme each application on the device can have its own class.

Defining the class of an application, for example personal or corporate, can be done by various entities, and the present disclosure is not meant to be limited to any particular entity defining the class of the application. In one embodiment, an enterprise information technology (IT) department may deem various applications to be work oriented and thus can, on an enterprise server or on the individual devices, designate that certain applications are considered to fall with a particular class. For example, with the two-class system of work in personal applications, the IT department can designate which applications are considered to be work applications on a user's device. The remaining applications on the device can then, by default, be designated as personal applications.

In other embodiments, the user can set the IT policy himself or herself for security purposes. Thus, the navigator entity can have a configuration option in which the various applications are configured to be either work or personal applications in a two-class system or can be configured to be one of various classes in a multi-class system. This permits the user to have a level of security if, for example, they leave their computer running or if a laptop or mobile device that they carry is misplaced or stolen.

A user utilizing the differentiated access system as described above can have easy access to their personal data and applications while at the same time providing for a secure environment for corporate or corporate applications meeting the IT policies of their enterprise.

Reference is now made to FIG. 1. FIG. 1 shows an example user interface. In one potential embodiment, the user interface may comprise a grid style type interface that shows thumbnails of applications that are currently running or potential applications that may be launched. Thus, for example, in FIG. 1, user interface 110 on mobile device 100 includes icons 120, 122, 124, 126, 128 and 130. Each of these thumbnails can represent an application that is currently running, for example. In one embodiment, the grid style may show the current screen shot of the application as it is currently running. Thus, for example, icon 128 may represent a spreadsheet application or spreadsheet viewer that shows a view of the data on a current spreadsheet.

In order to bring an application into focus, or enable the application, the user may select one of the thumbnails. The selection causes the application to become the application in focus.

In other embodiments, rather than having thumbnails in a grid style, various navigator entities an include icons or text or other combinations to identify the various applications, either potentially to be launched or already running, to a user. The present disclosure is not meant to be limited to any particular representation of applications to a user.

Figure 2:
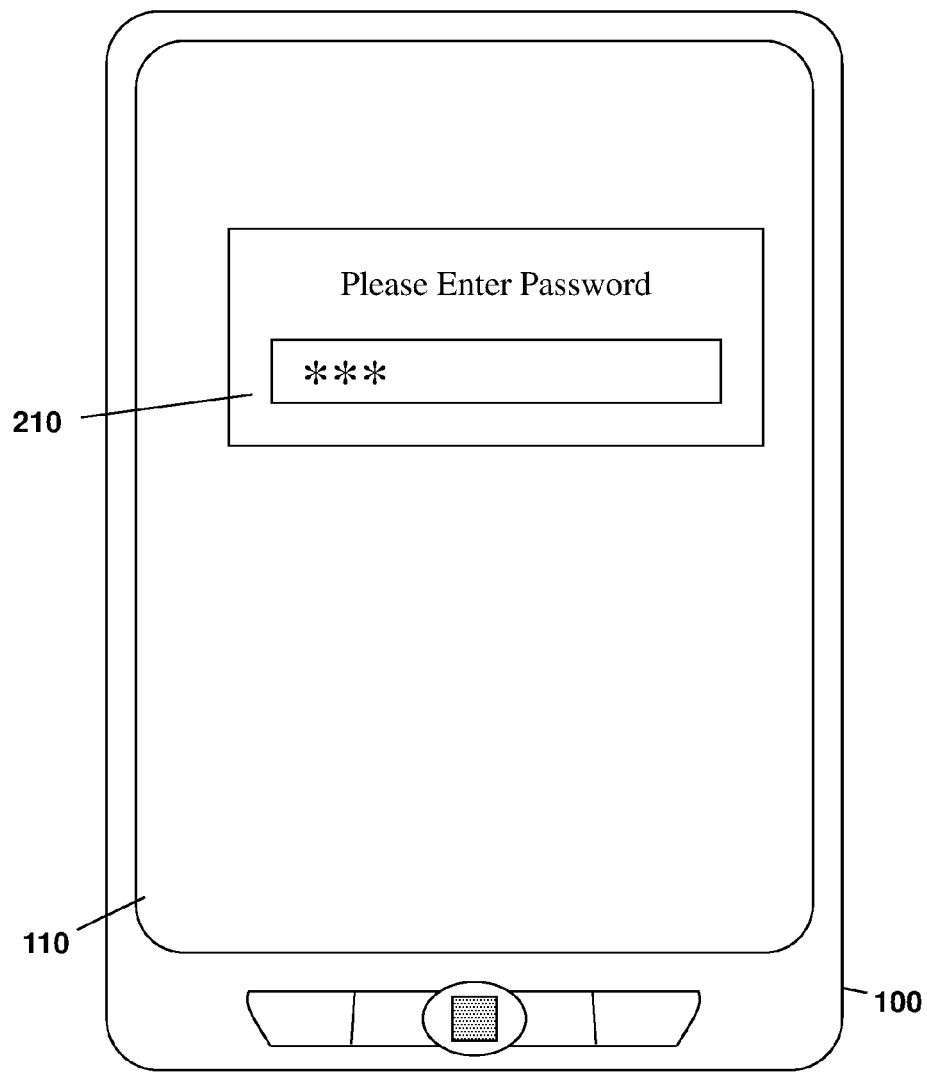
FIG. 2 is a representation of an example user interface in which the mobile device is locked and requires a password.

Reference is now made to FIG. 2. FIG. 2 shows a mobile device 100 on which there has been no activity for a particular amount of time. In this case, the user interface 110 has been locked by the navigation entity and the user is required to enter a password to unlock the device, as is shown by password prompt 210. In this case, the entire device is locked and password entry is prompted to access both personal and corporate data.

Figure 3A:
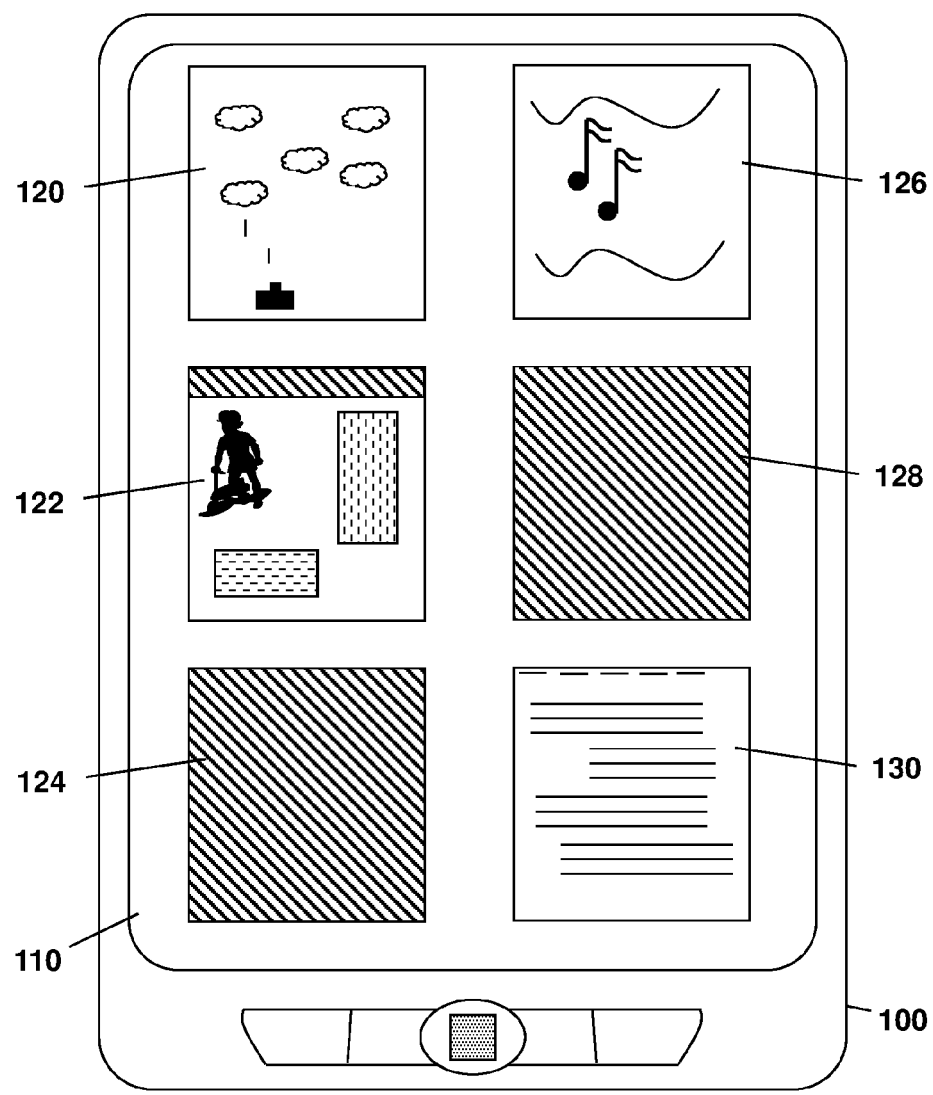
FIG. 3A is an example user interface representation showing a cover sheet with running applications in which a subset has been locked.

Referring to FIG. 3A, FIG. 3A shows an embodiment in which the mobile device 100 has user interface 110 showing the applications already running or capable of being launched. As with FIG. 1, the embodiment of FIG. 3A shows a grid style navigation in which various applications can be selected and thumbnails of the current screen on those applications is shown. However, the embodiment of FIG. 3A has had a period of inactivity in which work/corporate applications have been locked. In the embodiment of FIG. 3A, applications 120, 122, 126 and 130 are personal applications and are shown as being selectable to a user.

Conversely, applications 124 and 128 have now been made inaccessible and would require password entry in order to access or launch the applications.

Instead of graying-out the application other options are possible. For example, the thumbnails may be provided in a different color. However, if a thumbnail contains a screenshot, sensitive data may be visible even when the device is locked. Thus, the graying-out of the application can provide additional security.

In other options, instead of providing a gray box, an icon or some other visual display may be provided to a user, and the present disclosure is not meant to be limited to any particular symbol or way or representing or showing restricted access to applications.

Thus, in the embodiment of FIG. 3A, the applications represented by thumbnails 120, 122, 126 and 130 can be launched without any restriction but the applications represented by thumbnails 124 and 128 would require a password entry to unlock them.

Figure 3B:
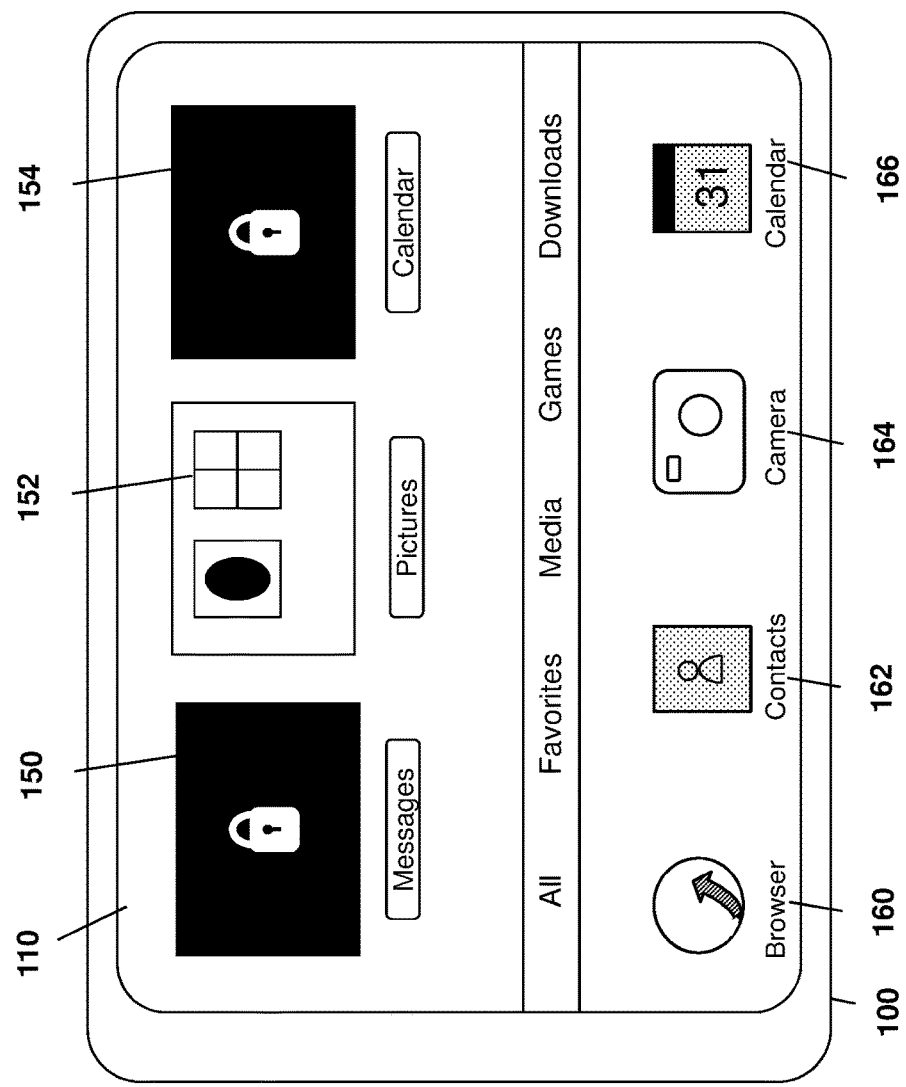
FIG. 3B is another example user interface representation showing a cover flow with running applications in which a subset has been locked.

Another example cover flow style user interface is shown with regard to FIG. 3B. In particular, in FIG. 3B, applications 150, 152 and 154 are running. However, due to inactivity, the windows for applications 150 and 154 have been obscured, for example, blacked out. In the example of FIG. 3B, a lock icon is placed over these application thumbnails. In another example, the windows and icons may be obscured by being hidden when their respective applications are locked.

Similarly, applications that are considered to be within a class of locked applications will not be permitted to be started by the application launcher. Thus, in the example of FIG. 3B, applications icons 160, 162, 164, and 166 allow the respective applications to be started. In the example of FIG. 3B, however, application icons 162 and 166 are shown obscured, for example, greyed out, indicating that these applications cannot be launched or enabled without receipt of a password because they are considered to be in the class of locked applications.

Figure 4:
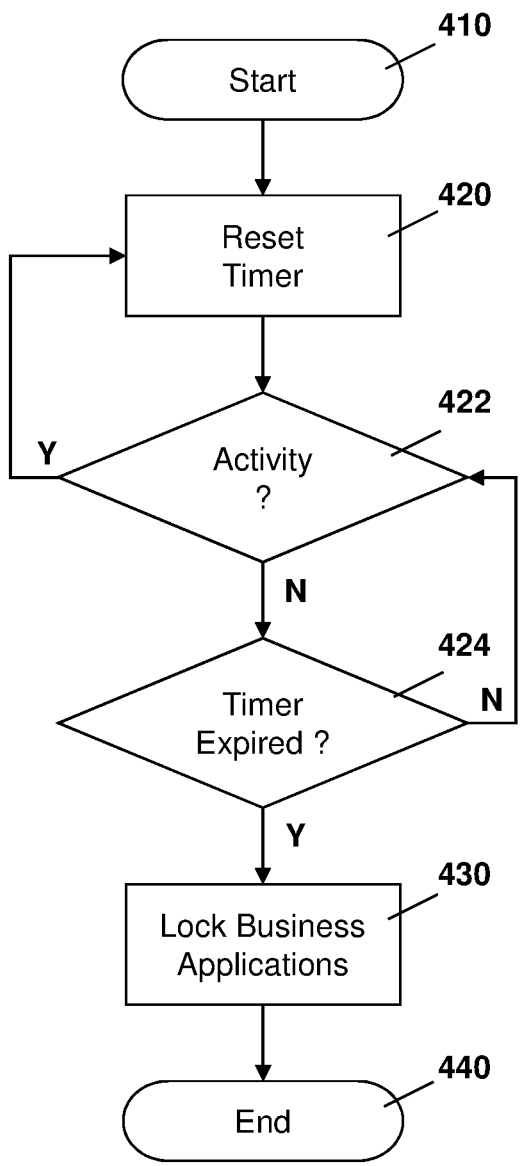
FIG. 4 shows a data flow diagram for locking a subset of applications.

Reference is now made to FIG. 4. A navigation entity on the mobile device may track the various applications and determine when they should be locked. One example method of locking the applications at the navigation entity is shown in FIG. 4.

The process of FIG. 4 starts at block 410 and proceeds to block 420 in which a timer is reset. The timer represents the maximum inactivity time before applications are locked. The value of the timer at block 420 can be determined by the user, by an IT department from the user's enterprise, or it can be provisioned by a mobile device manufacturer or set by a carrier of a mobile device, among various other options.

From block 420, the process proceeds to block 422 in which a check is made to determine whether any activity has occurred. If activity has occurred, the process proceeds from block 422 to block 420 in which the timer is reset.

From block 422, if no activity has occurred on the device the process proceeds to block 424 in which a check is made to determine whether or not the timer has expired. If not, the process proceeds back to block 422 to continue to check for activity and to block 424 to determine whether the timer has expired.

From block 424, if the timer has expired, the process proceeds to block 430 in which office applications are locked and would require a password to launch the applications. Corporate or work applications may be identified in various ways. For example, the navigation entity can have a list of applications and a flag can be associated with each, where the flag indicates whether or not the application is a corporate application. In other embodiments, the navigation entity can query an enterprise server when locking applications. In other embodiments, a list of applications that are corporate applications can be stored and the navigation entity goes through the list to lock the applications within the list. Other examples of identifying corporate applications are possible.

The process then proceeds to block 440 and ends.

The check at block 422 to determine whether activity has occurred may be looking for various activity. In one embodiment, any use of a user interface on the device can be considered to be activity and thus reset the inactivity timer. However, in other embodiments, "activity" may include use of work applications only. Thus, for example, if the user is using a personal application and is not using any work application, the activity check in block 422 may be looking to see whether or not there is activity on the work applications and may cause the work applications to lock even though the user is interacting with the device.

In other embodiments, each application or class of application can have its own inactivity time before it locks. Thus, applications that are more likely to access more sensitive data can have a shorter inactivity period than other applications that may not be as sensitive.

Figure 5:
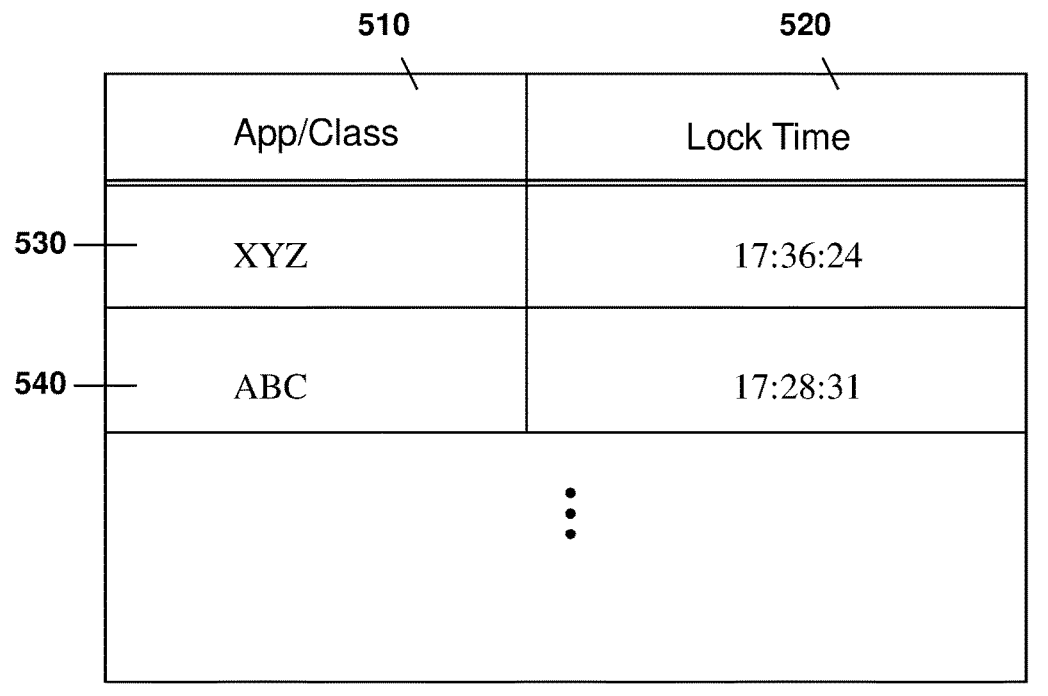

Reference is now made to FIG. 5. A navigation entity may keep a table or list of the various classes of applications and a lock time for each class. The example of FIG. 5 shows a table in which each of the classes 510 is associated with a lock time 520.

Lock time 520 can be an absolute time at which the class is locked. Alternatively, it can include a timer value or a countdown time.

For example, in row 530, class XYZ has a lock time represented as an absolute time of 17:36:24, indicating that at 5:36 pm and 24 seconds the application will lock. Column 540 includes a class ABC which has a lock time of 17:28:31 which indicates that at 5:28 and 31 seconds, class ABC will be locked.

Figure 6:
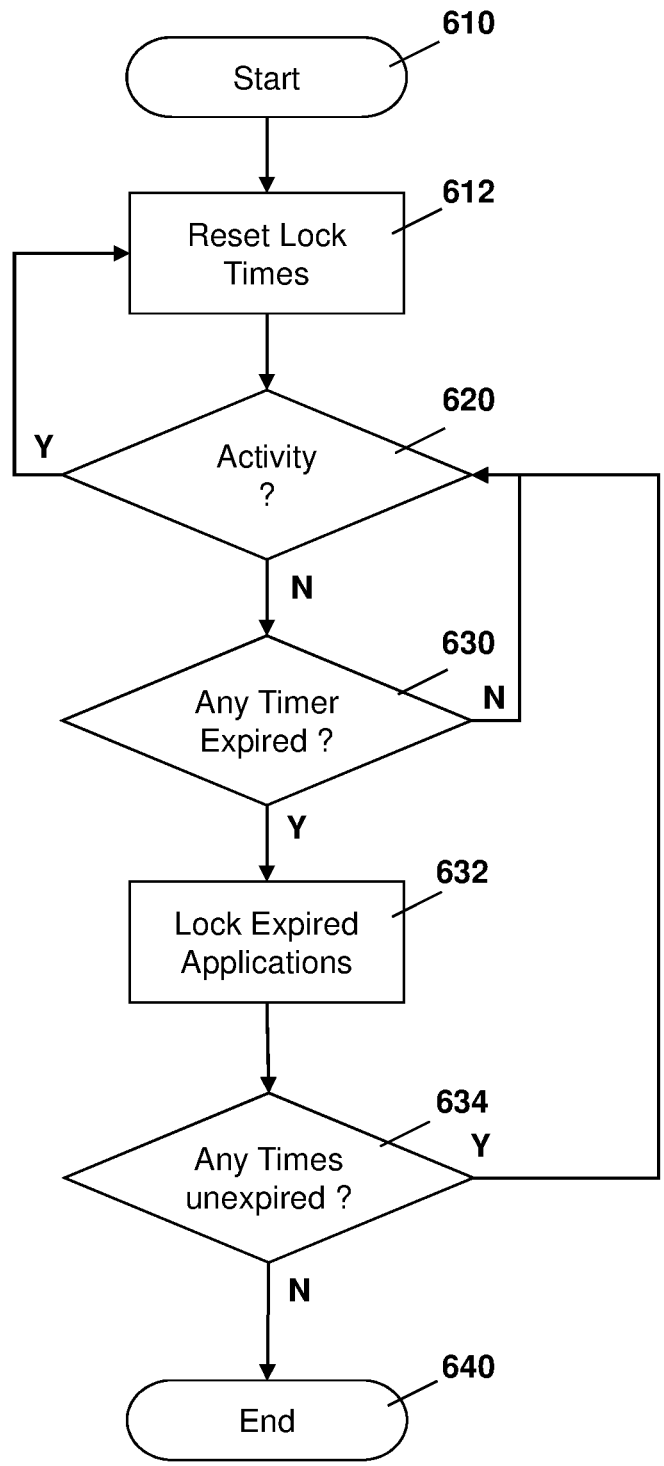
FIG. 6 is a data flow diagram showing the locking of various subsets of applications at different times.

Referring to FIG. 6, FIG. 6 shows a process for locking the various classes at individual times. The process of FIG. 6 starts a block 610 and proceeds to block 612 in which the lock times are reset for those applications or classes that are not already locked.

The process then proceeds to block 620 in which a check is made to determine whether there is any activity. If yes, the process proceeds back to block 612 in which the lock times are reset for the applications that are not already locked. Thus, referring to FIG. 5, the class XYZ may be, for example, the current time plus 5 minutes of inactivity and thus the lock time represented in column 520 can be reset to the current time plus 5 minutes. Similarly, class ABC may be current time plus 3 minutes of inactivity and the lock time in column 520 would be reset to this value.

From block 620, if there is no activity the process proceeds to block 630 to determine whether or not the time has expired for any class. This can be done by checking the current time against all of the entries in the lock time, for example. In other embodiments, if the column 520 represents a countdown timer then the check at block 630 may include the decreasing of the time and check to see whether or not any of the times have reached zero. Other options are also available.

From block 630, if no timers have expired the process proceeds back to block 620 and the process continues to check between block 620 and 630 until either activity occurs or until one of the activity timers expires.

From block 630, the process proceeds to block 632 in which the class or application whose timer has expired is locked. The process then proceeds to block 634 in which a check is made to determine whether there are any other classes or applications which have unexpired lock times. If yes, the process proceeds back to block 620 to either check for activity and continues to check between block 620 and 630 until the remaining timers or times have expired.

Utilizing the example of FIG. 5, if the time for class ABC expires, the process will proceed to block 632 and lock the applications associated with class ABC. At this time, class XYZ is still active and therefore the process will proceed from block 634 back to block 620. In this example, if activity occurs, the process will proceed back to block 612 in which the lock times will be reset. However, since class ABC is already locked, the process will merely reset the lock time for class XYZ.

From block 634, if all of the lock times have expired, the process will proceed to block 640 and ends.

The process of FIG. 6 can be restarted if the applications are then unlocked.

The navigation entity will also control the launching or enabling of applications. As used herein, launching applications refers to starting applications that are currently not running. Enabling applications refers to the bringing into focus of currently running applications.

In an alternative embodiment, the locking may be controlled based on the status of a paired device. In particular, the locking can be controlled based on whether a paired device has locked (based on a timeout or a manual lock) or whether a connection to the paired device has been lost.

Figure 7:
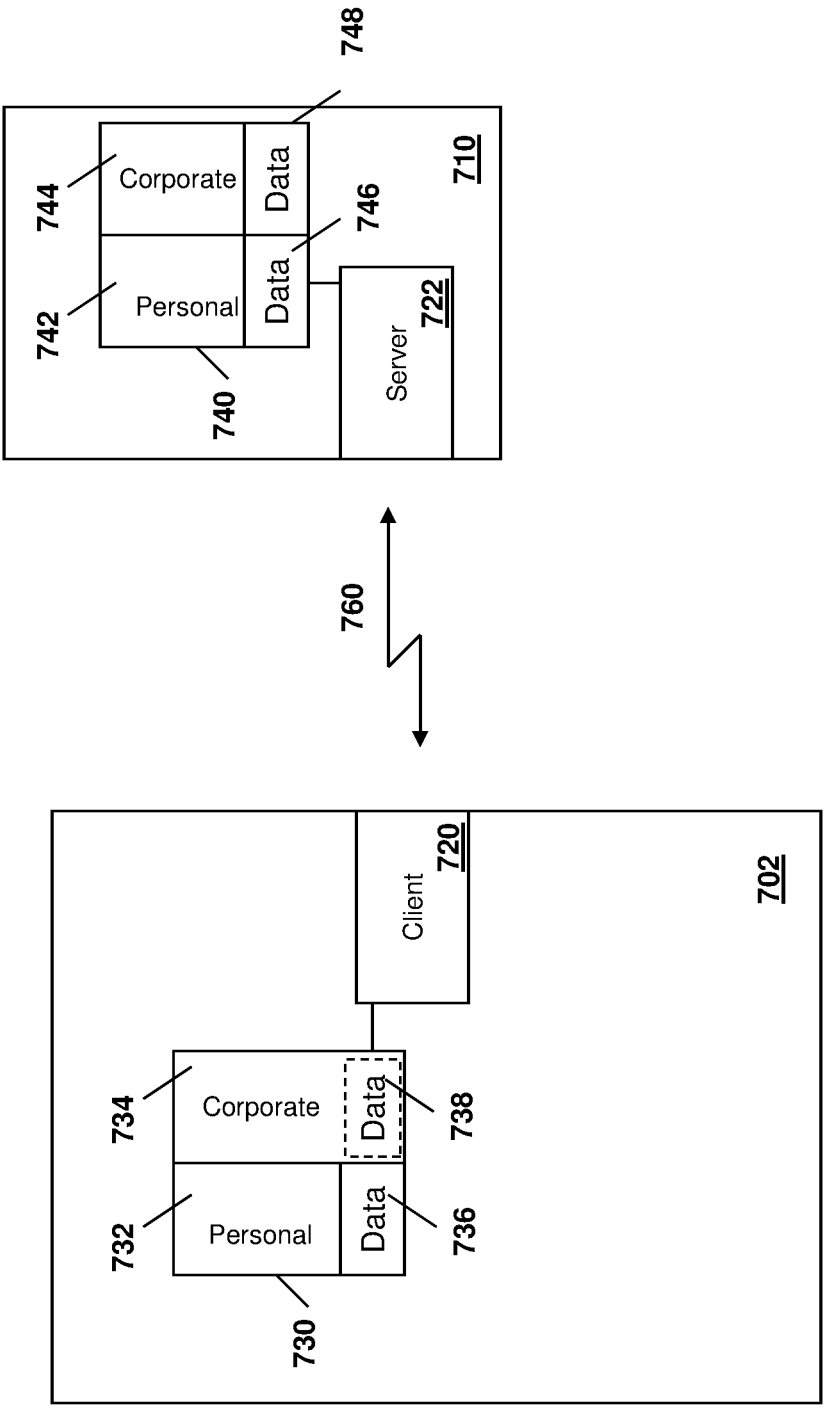
FIG. 7 is a block diagram showing a connection between a secure device and a non-secure device.

Reference is now made to FIG. 7. In one embodiment, control of a subset of applications on a computing device 702 may be based on a connection to a secure (IT trusted) computing device 710.

In one example, the secure device comprises mobile device 710. However, this is merely an example and other possibilities for secure mobile devices are known. The computing device 702 may comprise a tablet computer in one example.

The example of FIG. 7 uses two classes of data/applications, corporate and personal. However, this is merely an example and more classes of data/applications may be used.

In order to run corporate applications on computing device 702, a client 720 may be provided on the computing device 702. Client 720 communicates with a server 722 on the mobile device 710 to obtain corporate data.

Further, the computing device 702 may include memory which has a corporate space 734 for storing corporate applications that may be run on computing device 702. Computing device 702 may also have a personal space 732 within memory 730.

As seen in the example of FIG. 7, the personal mobile space contains applications 732 which may access data 736. However, no similar data exists for corporate applications 734.

In an alternative embodiment, corporate space 734 may have data 738 which may be regulated by the same corporate policies as data 748 on mobile device 710. Thus, data 738 would be subject to access restrictions to corporate applications, garbage collection, restrictions on copying or cutting, among the other restrictions provided above. The client 710 may provide this functionality.

On mobile device 710 the divided modes are similarly provided. In particular, application space 740 contains a personal application area 742 and a corporate application area 744.

In order to provide security, a user of computing device 702 may start an application under the corporate application 734. As indicated above, a password may be required to start such applications.

Client 710 recognizes that a corporate application 734 is running and can communicate with server 720 to indicate that corporate data can be provided. In this way server 720 can access the corporate data that is either in data storage 748 or the corporate data can be obtained from an enterprise server.

Corporate applications 744 do not necessarily have to be the same as corporate applications 734. For example, with a larger display, computing device 702 may be able to run different applications or variations of applications 744. The corporate data 748 may be the same between the two sets of applications, but can be displayed to the user or used by corporate applications 734 differently than the data 748 would be used on mobile device 710.

The corporate data may then be provided over a connection 760 between mobile device 710 and computing device 702. Connection 760 may comprise any short or long range wired or wireless connection and examples of such connections include Bluetooth™, Universal Serial Bus (USB), IrDA, WiFi, NFC, among others.

Communication over link 760 can be secure. That is, corporate data that is passed to computing device 702 or back to mobile device 710 may be encrypted. In one embodiment, the encryption key may be stored on mobile device 710 thus necessitating the connection in order to decrypt the data on the computing device 702.

Further, it may be a policy that the data is not stored on computing device 702. Thus, except for some caching that is required for smooth operation of computing device 702, corporate data will not be stored on device 702. Further, client 710 can ensure that the cache is cleared prior to the corporate application shutting down.

In terms of locking applications on computing device 702, the locking may be based on mobile device 710.

In one embodiment, corporate applications 734 can be locked if mobile device 710 times out from inactivity and thus locks. This would then require a user to enter a password to unlock mobile device 710 and corporate applications 734. The locking of mobile device 710 may also be a result of an explicit action to lock the mobile device 710.

In a further embodiment, corporate applications 734 may lock if the connection 760 between computing device 702 and mobile device 710 is disconnected. In this case the connection may need to be re-established prior to applications 734 being enabled or started.

The locking of applications may result in a cover flow style similar to that of FIGS. 3A and 3B. A user might also be prompted for the mobile device 710 password when trying to access or enable a corporate application.

Personal applications 732 may be unaffected by the connection to mobile device 710 in one embodiment, and in accordance with the above, remain unlocked even if corporate applications 734 are locked.

Figure 8:
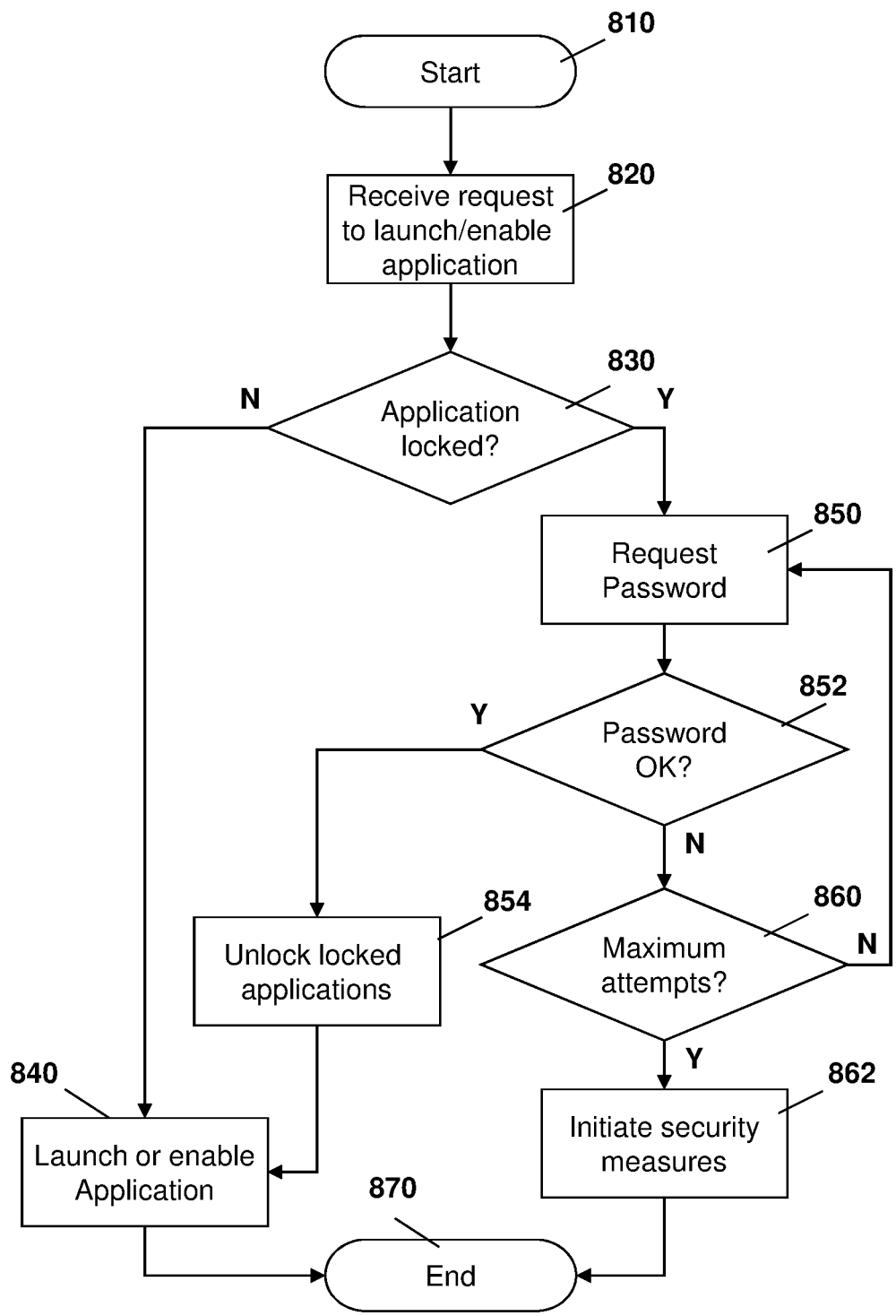
FIG. 8 is a flow diagram showing the launching or enabling of an application.

Reference is now made to FIG. 8. In FIG. 8, the process starts at block 810 and proceeds to block 820 in which a navigation entity has received a request to launch or enable an application. The process then proceeds to block 830 to check whether or not the application for which the request was received is locked. If no, the process proceeds to block 840 and launches or enables the application.

Conversely, if the application is locked, assuming that a connection exists to a mobile device 710 if required to launch the application, the process proceeds to block 850 to request the password to unlock the application.

From block 850 the process proceeds to block 852 to check whether or not the password is correct. If yes, the process proceeds to block 854 in which other locked applications are also unlocked based on the successful password entry and the process then proceeds to block 840 in which the application is launched or enabled.

From block 852 if the password is not valid the process may proceed to block 860 in which a check is made to determine whether the maximum number of attempts at entering the password has occurred. If no, the process may proceed back to block 850 to prompt the user for a password again.

From block 860, if the maximum number of password attempts have been made, the process proceeds to block 862 in which security measures are initiated based on the maximum number of attempts being reached. This may include wiping out the memory of the device completely, blocking attempts at access for a predetermined time period, among other options.

From block 862 or block 840 the process proceeds to block 870 and ends.

Figure 9:
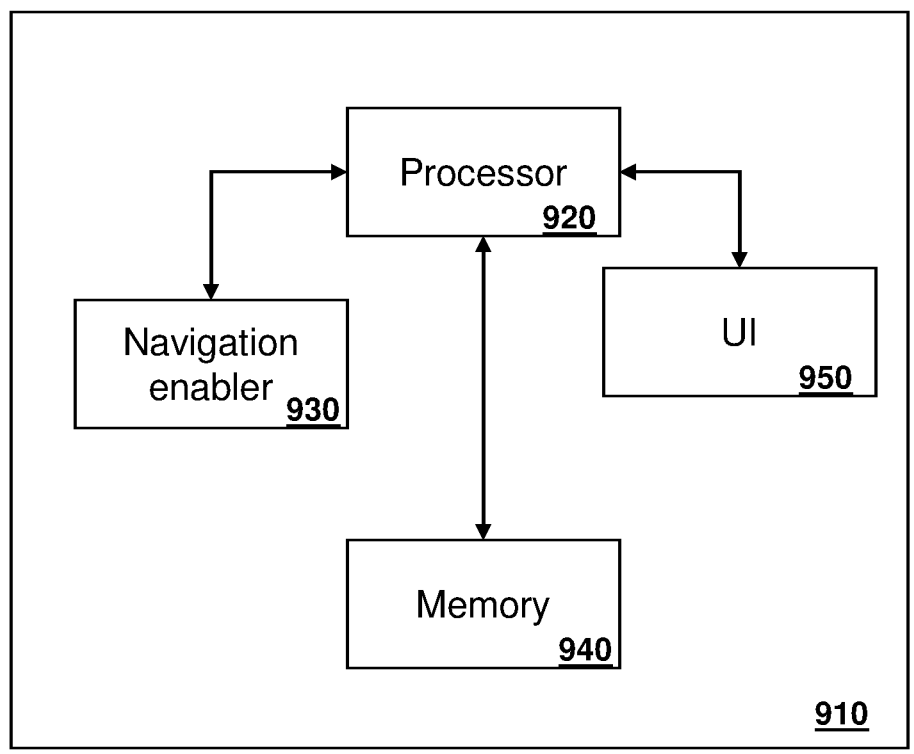
FIG. 9 shows a simplified block diagram of a computing device.

The navigator entity may be found on any computing device. Referring to FIG. 9, FIG. 9 shows a simplified block diagram of a computing device. In the example of FIG. 9, device 910 includes a processor 920. Processor 920 interacts with a navigator entity 930, which may be a software application found on device 910.

Processor 920 further interacts with an application memory 940. In one embodiment, application memory 940 may be segregated in some embodiments to provide security for locked applications verses unlocked applications. Thus, the two memory areas may be separate and may be inaccessible by applications that are of different classes. This is similar to, for example, UNIX file permissions in which various group permissions can be set for various applications. In this way, portions of application memory 940 may be inaccessible by non-authorized applications, thereby providing additional security.

Processor 920 may further communicate with a user interface 950. User interface 950 can comprise any user interface, including, for example, a display on the computing device, audio output means, as well as input means such as a keyboard, mouse, stylus, touch screen, among others. Software for processor 920 may display the various applications on user interface 950. Further, navigator entity 930 may provide that certain application representations on the user interface be displayed as grayed-out or unavailable until a password is entered utilizing the input component of user interface 950.

Figure 10:
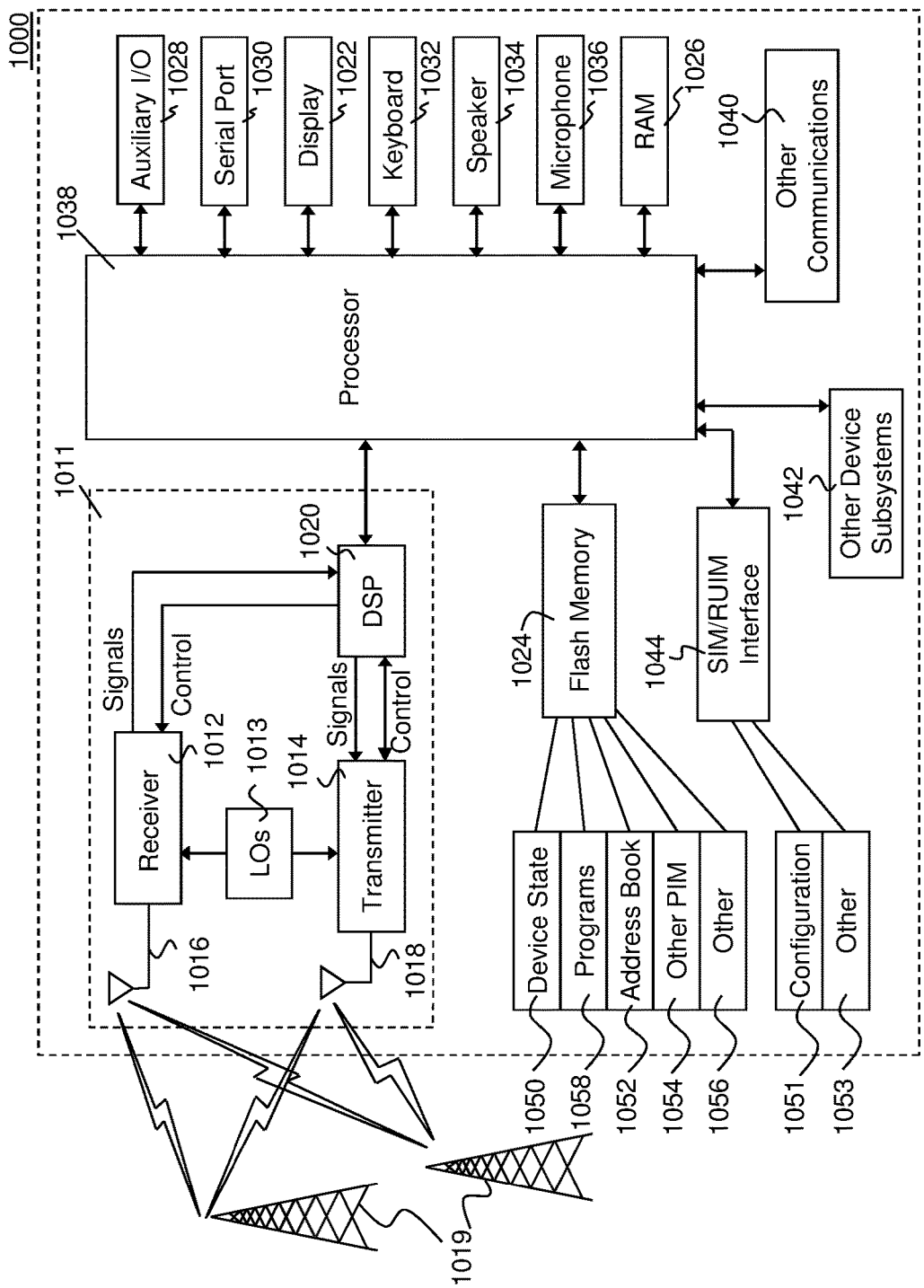
FIG. 10 is a block diagram of an example mobile device capable of being used with the present disclosure.

While computing device 100 or 710 or 810 may be any computing device, as indicated above, in one embodiment computing device 100, 710 or 810 may be a mobile device. One such mobile device is illustrated below with reference to FIG. 10. The mobile device of FIG. 10 is however not meant to be limiting and other mobile devices may also be used.

Mobile device 1000 may comprise a two-way wireless communication device having voice and data communication capabilities. Mobile device 1000 generally has the capability to communicate with other devices or computer systems. Depending on the exact functionality provided, the mobile device may be referred to as a data messaging device, a smartphone, a tablet, a computer, a wireless e-mail device, a cellular telephone, a wireless Internet appliance, a wireless device, a user equipment, or a data communication device, as examples.

Where mobile device 1000 is enabled for two-way communication, it will incorporate a communication subsystem 1011, including both a receiver 1012 and a transmitter 1014, as well as associated components such as one or more antenna elements 1016 and 1018, local oscillators (LOs) 913, and a processing module such as a digital signal processor (DSP) 920. The particular design of the communication subsystem 1011 will be dependent upon the communication network in which the device is intended to operate.

Network access requirements will also vary depending upon the type of network 1019. In some networks, network access is associated with a subscriber or user of mobile device 1000. A mobile device may require a removable user identity module (RUIM) or a subscriber identity module (SIM) card in order to operate on the network. The SIM/RUIM interface 1044 may be similar to a card-slot into which a SIM/RUIM card can be inserted and ejected like a diskette or PCMCIA card. The SIM/RUIM card can have memory and hold many key configuration 1051, and other information 1053 such as identification, and subscriber related information. A SIM/RUIM is however an optional feature.

When required network registration or activation procedures have been completed, mobile device 1000 may send and receive communication signals over the network 1019. As illustrated in FIG. 10, network 1019 can consist of multiple base stations communicating with the mobile device. For example, in a hybrid CDMA 1×EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology. In other embodiments, the mobile device may communicate with an access point rather than, or in addition to, a cellular network. Such communication may be done using WiFi or WiMAX, for example.

Signals received by antenna 1016 through communication network 1019 are input to receiver 1012, which may perform such common receiver functions as signal amplification, frequency down conversion, filtering, channel selection and the like, and in the example system shown in FIG. 10, analog to digital (A/D) conversion. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Mobile device 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 may include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list, among other applications.

Operating system software used by the processor 1038 may be stored in a persistent store such as flash memory 1024, which may instead be a read-only memory (ROM) or similar storage element (not shown). In one embodiment, the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. This may further provide security if some applications are locked while others are not.

Processor 1038, in addition to its operating system functions, may enable execution of software applications on the mobile device. A predetermined set of applications that control basic operations, including at least data and voice communication applications for example, will normally be installed on mobile device 1000 during manufacturing. Other applications can be installed subsequently or dynamically.

Applications and software, such as those for implements the process of FIGS. 4 to 7, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 1019. In one embodiment, the PIM data items are seamlessly integrated, synchronized and updated, via the wireless network 1019, with the mobile device user's corresponding data items stored or associated with a host computer system. Further applications, such as a media player; a camera; a messenger; mail; social networking; a web browser; games; electronic book readers; wallet; maps, among others, may also be loaded onto the mobile device 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the mobile device 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of mobile device 1000 may also compose data items such as email messages for example, using the keyboard 1032, which may be a complete alphanumeric keyboard or telephone-type keypad, among others, in conjunction with the display 1022 and possibly an auxiliary I/O device 1028. Such composed items may then be transmitted over a communication network through the communication subsystem 1011.

For voice communications, overall operation of mobile device 1000 is similar, except that received signals would typically be output to a speaker 1034 and signals for transmission would be generated by a microphone 1036. Alternative voice or audio I/O subsystems, such as a voice message recording subsystem, may also be implemented on mobile device 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type mobile device for which synchronization with a user's desktop computer (not shown) may be desirable, but is an optional device component. Such a port 1030 would enable a user to set preferences through an external device or software application and would extend the capabilities of mobile device 1000 by providing for information or software downloads to mobile device 1000 other than through a wireless communication network. The alternate download path may for example be used to load an encryption key onto the device through a direct and thus reliable and trusted connection to thereby enable secure device communication. Serial port 1030 can further be used to connect the mobile device to a computer to act as a modem.

Other communications subsystems 1040, such as a short-range communications subsystem, is a further optional component which may provide for communication between mobile device 1000 and different systems or devices, which need not necessarily be similar devices. For example, the subsystem 1040 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for providing differentiated access control on a computing device having a connection with a second device, the method comprising:
   receiving, at the computing device, an input to start an application belonging to a first of a plurality of application subsets, the starting the application comprising executing the application on the computing device;
   receiving, at the computing device, a user input to unlock the second device;
   verifying the user input with the second device to unlock the first of the plurality of application subsets;
   checking whether a timer has expired on the second device or—whether a connection is lost to the second device, and based on expiration of the timer or loss of the connection to the second device, locking the first of the plurality of applications subsets on the computing device, the locking including:
      allowing access to applications within at least a second of the plurality of application subsets, including allowing launching and enabling of at least one application within the at least the second of the plurality of application subsets;
      preventing each application of the first of the plurality of application subsets from being launched on the computing device while the first of the plurality of applications subsets is locked; and
      disabling a graphical user interface associated with each application of the first of the plurality of application subsets
   wherein the timer is associated with a countdown timer managed by the second device for decreasing time.

2. The method of claim 1, wherein each of the plurality of application subsets utilizes a separate file system in memory of the computing device.

3. The method of claim 1, wherein the disabling comprises changing a graphical representation of an application window or icon displayed on the computing device.

4. The method of claim 3, wherein the graphical representation is a grid style and the changing replaces the application window with an obscured or locked graphic.

5. The method of claim 1, wherein the disabling comprises making an application window inaccessible.

6. The method of claim 1, wherein the first of the plurality of application subsets includes applications designated as corporate applications.

7. The method of claim 6, wherein the designating is based on an enterprise information technology policy.

8. The method of claim 6, wherein the designating is done on the computing device.

9. The method of claim 1, further comprising unlocking each application associated with the first of the plurality of applications subsets in response to successful authentication.

10. A computing device comprising:
   a processor;
   a communications subsystem;
   a user interface; and
   memory,
wherein the computing device communicates with a second device, and wherein the computing device is configured to:
   receive an input to start an application belonging to a first of a plurality of application subsets, the starting the application comprising executing the application on the computing device;
   receive a user input to unlock the second device;
   verify the user input with the second device to unlock the first of the plurality of application subsets;

determine whether a timer has expired on the second device or whether a connection is lost to the second device, and based on expiration of the timer or loss of the connection to the second device, lock the first of the plurality of applications subsets on the computing device, the locking including:
  allowing access to applications within at least a second of the plurality of application subsets, including allowing launching and enabling of at least one application within the at least the second of the plurality of application subsets;
  preventing each application of the first of the plurality of application subsets from being launched on the computing device while the first of the plurality of applications subsets is locked; and
  disabling a graphical user interface associated with each application of the first of the plurality of application subsets
wherein the timer is associated with a countdown timer managed by the second device, for decreasing time.

11. The computing device of claim 10, wherein each of the plurality of application subsets utilizes a separate file system in memory of the computing device.

12. The computing device of claim 10, wherein the computing device is configured to disable a graphical user interface by changing a graphical representation of an application window or icon displayed on the computing device.

13. The computing device of claim 12, wherein the graphical representation is a grid style and the changing replaces the application window with an obscured or locked graphic.

14. The computing device of claim 10, wherein the computing device is configured to disable a graphical user interface by making an application window inaccessible.

15. The computing device of claim 10, wherein the computing device comprises at least one of a mobile device, smartphone, a tablet computer, a desktop computer, or a laptop computer.

16. A non-transitory computer readable medium for storing instruction code, which, when executed by a processor of a computing device are configured to provide differentiated access control on the computing device having a connection with a second device, the instruction code comprising instructions for:
  receiving an input to start an application belonging to a first of a plurality of application subsets, the starting the application comprising executing the application on the computing device;
  receiving a user input to unlock the second device;
  verifying the user input with the second device to unlock the first of the plurality of application subsets;
  checking whether a timer has expired on the second device or whether a connection is lost to the second device, and based on expiration of the timer or loss of the connection to the second device, locking the first of the plurality of applications subsets on the computing device, the locking including:
    allowing access to applications within at least a second of the plurality of application subsets, including allowing launching and enabling of at least one application within the at least the second of the plurality of application subsets;
    preventing each application of the first of the plurality of application subsets from being launched on the computing device while the first of the plurality of applications subsets is locked; and
    disabling a graphical user interface associated with each application of the first of the plurality of application subsets
  wherein the timer is associated with a countdown timer managed by the second device, for decreasing time.

17. The non-transitory computer readable medium of claim 16, wherein each of the plurality of application subsets utilizes a separate file system in memory of the computing device.

18. The non-transitory computer readable medium of claim 16, wherein the disabling comprises changing a graphical representation of an application window or icon displayed on the computing device.

19. The non-transitory computer readable medium of claim 18, wherein the graphical representation is a grid style and the changing replaces the application window with an obscured or locked graphic.

20. The non-transitory computer readable medium of claim 16, wherein the disabling comprises making an application window inaccessible.

21. The non-transitory computer readable medium of claim 16, wherein the first of the plurality of application subsets includes applications designated as corporate applications.

22. The non-transitory computer readable medium of claim 21, wherein the designating is based on an enterprise information technology policy.

23. The non-transitory computer readable medium of claim 21, wherein the designating is done on the computing device.

24. The non-transitory computer readable medium of claim 16, wherein the instruction code further comprises instructions unlocking each application associated with the first of the plurality of applications subsets in response to successful authentication.

* * * * *